US011957272B2

(12) United States Patent
Waechter et al.

(10) Patent No.: US 11,957,272 B2
(45) Date of Patent: Apr. 16, 2024

(54) APPARATUS FOR DISPENSING A LIQUID FOODSTUFF

(71) Applicant: Franke Kaffeemaschinen AG, Aarburg (CH)

(72) Inventors: Serge Waechter, Basel (CH); Simon Mueller, Muhen (CH)

(73) Assignee: Franke Kaffeemaschinen AG, Aarburg (CH)

( * ) Notice: Subject to any disclaimer, the term of this patent is extended or adjusted under 35 U.S.C. 154(b) by 450 days.

(21) Appl. No.: 17/197,465

(22) Filed: Mar. 10, 2021

(65) Prior Publication Data

US 2021/0289984 A1 Sep. 23, 2021

(30) Foreign Application Priority Data

Mar. 19, 2020 (DE) .......................... 102020107545.6

(51) Int. Cl.
*A47J 31/60* (2006.01)
*A47J 31/46* (2006.01)
(Continued)

(52) U.S. Cl.
CPC ............. *A47J 31/60* (2013.01); *A47J 31/461* (2018.08); *A47J 31/462* (2013.01); *A47J 31/468* (2018.08); *A47J 31/5253* (2018.08); *B08B 9/0325* (2013.01); *F24H 1/121* (2013.01); *B08B 2209/032* (2013.01)

(58) Field of Classification Search
CPC ................ A47J 31/3671; A47J 31/5253; A47J 31/3609; A47J 31/525; A47J 31/42; A47J 31/52; A47J 31/404; A47J 31/36; A47J 31/5255; A47J 31/34; A47J 31/545; A47J 31/24; A47J 31/30; A47J 31/5251; A47J 31/468; A47J 31/56; A23F 5/26
USPC ......... 99/300, 293, 295, 279, 280, 281, 282, 99/283, 284, 291, 453, 452
See application file for complete search history.

(56) References Cited

U.S. PATENT DOCUMENTS

2003/0196277 A1 10/2003 Hallman et al.
2020/0054164 A1* 2/2020 Moon .................... A47J 31/461

FOREIGN PATENT DOCUMENTS

CN 1731948 2/2006
CN 105497930 4/2016
(Continued)

*Primary Examiner* — Phuong T Nguyen
(74) *Attorney, Agent, or Firm* — Volpe Koenig

(57) ABSTRACT

An apparatus for dispensing a liquid foodstuff, in particular milk, includes a heating device for heating the liquid foodstuff, which has a fluid path for the liquid foodstuff and an electric heater. The fluid path and heater are in thermal contact with a heat store made from a material of high thermal mass and conductivity, and the heat store is brought by the heater to an operating temperature which lies below 80° C., preferably below 70° C. The fluid path is connectable via at least one directional control valve to a flushing line via which water and/or detergent can be conducted through the fluid path for cleaning purposes. A control device is provided that is configured to heat the heat store of the heating device to a temperature above 100° C. to carry out thermal regeneration, and to open the directional control device one or more times for conducting water or detergent solution through the fluid path of the heating device heated to a high temperature.

10 Claims, 3 Drawing Sheets

(51) Int. Cl.
    *A47J 31/52*    (2006.01)
    *B08B 9/032*    (2006.01)
    *F24H 1/12*    (2022.01)

(56) References Cited

FOREIGN PATENT DOCUMENTS

| | | |
|---|---|---|
| CN | 108208518 | 6/2018 |
| CN | 208838627 | 5/2019 |
| CN | 110291258 | 9/2019 |
| CN | 110996733 | 4/2020 |
| DE | 202007005738 | 7/2007 |
| DE | 202010010509 | 11/2011 |
| DE | 102015217964 | 3/2017 |
| DE | 102017114253 | 12/2018 |
| DE | 112018000582 | 11/2019 |
| EP | 3349627 | 7/2019 |
| JP | 2008119186 | 5/2008 |
| JP | 2017023602 | 2/2017 |
| JP | 2018122864 | 8/2018 |
| WO | 2011105942 | 9/2011 |

\* cited by examiner

APPARATUS FOR DISPENSING A LIQUID FOODSTUFF

INCORPORATION BY REFERENCE

The following documents are incorporated herein by reference as if fully set forth: German Patent application No. 10 2020 107 545.6, filed Mar. 19, 2020.

TECHNICAL FIELD

The present invention relates to an apparatus for dispensing a liquid foodstuff, in particular milk, with a heating device for heating the liquid foodstuff, which has a fluid path for the liquid foodstuff and an electric heater, wherein fluid path and heater are in thermal contact with a heat store made from a material of high thermal mass and conductivity, and the heat store is brought by the heater to an operating temperature which lies below 80° C., preferably below 70° C., and in which the fluid path is connectable via at least one directional control valve to a flushing line via which water and/or detergent can be conducted through the fluid path for cleaning purposes.

BACKGROUND

During the preparation of hot beverages, such as coffee, liquid foodstuffs, such as milk, milk froth or milk replacement products, are frequently added. Since such liquid foodstuffs are stored cooled, they have to be heated before being added to a hot beverage. This can be undertaken using a continuous flow heater with a thermal mass, what is referred to as a thermoblock.

A thermoblock is a heating device which has a fluid path for the liquid foodstuff and an electric heater, wherein fluid path and heater are in thermal contact with a heat store made from a metal of high thermal mass and/or conductivity, such as aluminum, brass or copper. An apparatus of this type for dispensing a liquid foodstuff can be integrated in a fully automatic coffee machine or configured as an add-on unit.

When milk or other protein-containing liquid foodstuffs are heated, deposits, what are referred to as fouling, may occur on the inner walls of the fluid path. In particular higher temperatures lead here to a greater formation of deposits. Continuous flow heaters for milk are therefore customarily operated at temperatures below 70° C. so as to avoid a greater formation of deposits. In addition, the fluid paths have to be regularly flushed with water and special milk-cleaning agent.

Despite controlling the temperature to an operating temperature of below 70° C., deposits cannot be completely avoided and, even with regular cleaning, the deposits are only incompletely removed.

SUMMARY

It is therefore an object of the present invention to specify an apparatus for dispensing a liquid foodstuff and a method for operating said apparatus, in which deposits in the region of the heating device can be better removed.

The object is achieved with respect to the apparatus and with respect to the method by one or more of the features as disclosed herein. Advantageous refinements can be gathered from the description below and the claims.

An apparatus of the type mentioned at the beginning is provided, according to the invention, with a control device which is configured to heat the heat store of the heating device to a high temperature of above 100° C. in order to carry out thermal regeneration, and to open the directional control valve one or more times for conducting water or detergent solution through the fluid path of the heating device heated to a high temperature.

The invention is based on the finding that, when the heating device is heated to over 100° C., a very high cleaning action for the residues adhering in the fluid path of the heating device can already be achieved with flushing once or more than once with cold water without detergent. In the fluid path heated to above 100° C., local evaporation and recondensing of the cold water flowing therethrough occurs. This cavitation leads to severe wall shear stresses and pressure fluctuations. In addition, the structure of the deposits is broken up by the evaporation of the moisture contained therein, and therefore the deposits can be detached more easily. An advantageous temperature range here is preferably above 110° C., furthermore preferably above 120° C.

The controller is preferably configured here to already fill the fluid path with water or detergent solution via the directional control valve prior to heating of the heating device to a high temperature. This ensures that the fluid path does not yet have any liquid foodstuff which would lead to the formation of further residues during heating.

The controller can be configured in particular to briefly open the directional control valve several times for intermittently conducting water through the fluid path of the heating device heated to a high temperature. A particularly good cleaning action is obtained by intermittently flushing with water.

In a preferred embodiment, the apparatus has a pump for conveying the liquid foodstuff out of a storage container via a foodstuff supply line, wherein the heating device is arranged on the delivery side of the pump for heating the foodstuff conveyed by the pump. In addition, it can be provided that the flushing line opens into the foodstuff supply line on the suction side of the pump. The pump can thus be equally used for conveying the liquid foodstuff during operation of the apparatus and for cleaning the heating device by, in the latter case, water or detergent solution being sucked up by the pump via the flushing line and being conveyed through the heating device. At the same time, the pump itself is also flushed here and foodstuff residues are removed.

In a preferred development, an air inlet opening into the foodstuff supply line on the suction side of the pump is additionally provided. Via said air inlet, in addition to the liquid foodstuff, air can be swept up, and is used to froth the liquid foodstuff in the pump and to dispense said foodstuff as frothed foodstuff. Within the scope of the invention, it is provided in particular here that the flushing line opens into an air intake line leading from the air inlet to the foodstuff line. The air inlet can furthermore be closed via an air valve. The air valve can serve on the one hand for metering the sucked-up quantity of air. On the other hand, in a cleaning situation, the air inlet can be closed and water or detergent solution can be conducted in the direction of the pump via the flushing line opening into the air intake line.

It has proven particularly advantageous, within the scope of the thermal regeneration when the heat store is heated to the high temperature, to conduct cold fresh water through the fluid path. For this purpose, a first directional control valve is opened to a fresh water flushing line. The thermal regeneration can be combined with a cleaning cycle with a detergent solution by previously or subsequently when the heating device is switched off or heated to the operating temperature, the detergent solution being conducted through the fluid path of the heating device. For this purpose, detergent solution can be sucked up out of a detergent mixing container via a pump and conducted through the fluid path. Subsequently, flushing is carried out once again with hot and/or cold water.

Within the scope of the method according to the invention for operating a heating device, it is provided according to the invention that the heat store is heated to a high temperature of over 100° C. for carrying out thermal regeneration and the directional control valve is opened one or more times in order to conduct water or detergent solution through the fluid path of the heating device heated to a high temperature.

BRIEF DESCRIPTION OF THE DRAWINGS

Further advantages and refinements of the invention emerge from the description below of an exemplary embodiment with reference to the single figures.

In the figures.

DETAILED DESCRIPTION

Figure 1:
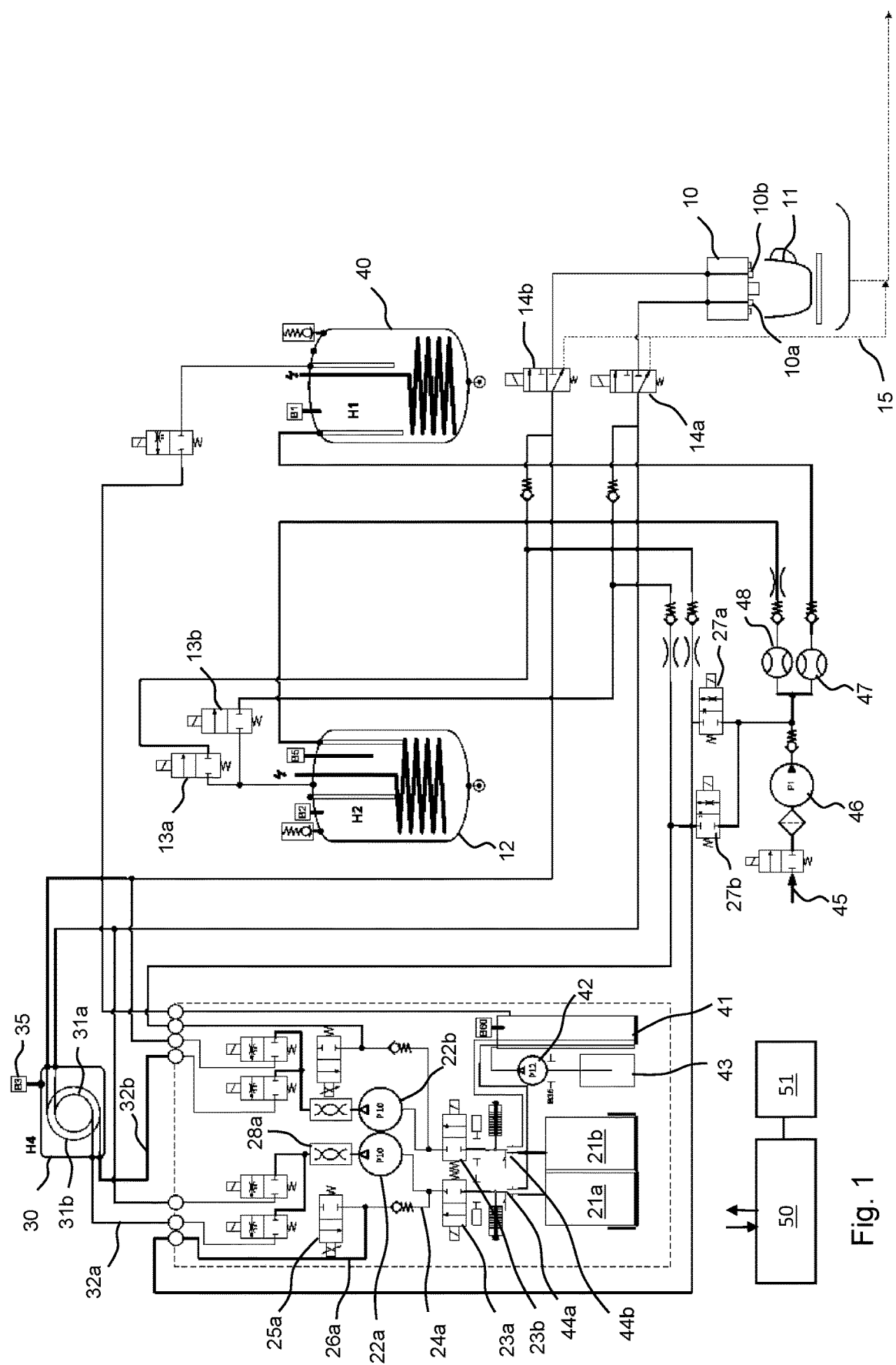
FIG. 1 shows a fluid diagram of an apparatus for dispensing a liquid foodstuff.

FIG. 1 illustrates what is referred to as a water flow diagram of the hydraulic components of a hot beverage dispensing apparatus. The hot beverage dispensing apparatus can be in particular a fully automatic coffee machine. The apparatus comprises an outlet head 10 under which a drinking vessel 11 is placed. Different hot beverages or beverage ingredients can be dispensed into the drinking vessel 11 via the outlet head 10. For this purpose, the apparatus comprises a hot water preparer 12 in the form of a boiler. Hot water can be dispensed to the outlets 10a, 10b of the outlet head 10 via the valves 13a, 13b. Via the switch-over valves 14a, 14b, the hot water for flushing the fluid paths can also be conducted directly into a drain via the drainage line 15.

The hot water from the hot water boiler 12 can be used, for example, to prepare hot tea or freshly brewed coffee. A corresponding brewing apparatus of the conventional type which is known per se is not illustrated here for the sake of clarity.

An essential feature within the scope of the present invention is the dispensing of liquid foodstuffs, in particular milk, kept ready in storage containers. For this purpose, a refrigerator 20 is provided in which two storage containers 21a, 21b are stored cooled. Two different liquid foodstuffs, for example normal whole milk and lactose-free milk or skim milk or else milk replacement products, such as almond milk, rice milk, soya milk or oat milk, can thus be stored. It is also possible to store other finished beverages, for example tea, in one of the storage containers 21a, 21b and optionally to dispense same as a hot beverage or hot beverage additive.

Each of the two storage containers 21a, 21b is respectively connected via an intake line to a pump 22a, 22b via which the relevant liquid foodstuff can be conveyed out of the storage container 21a, 21b to the outlet head 10. The fluid paths for the liquid foodstuffs stored in the two storage containers 21a, 21b run completely separately to the outlet head 10. Since the hydraulic circuit for the liquid foodstuffs from the two storage containers 21a, 21b is constructed symmetrically, only the fluid path for the foodstuff from the storage container 21a will be explained below. These explanations also apply correspondingly to the second fluid path of the foodstuff from the second storage container 21b.

A shut-off valve 23a is located in the intake line between storage container 21a and pump 22a. In addition, an air line 24a opens into the intake line between the shut-off valve 23a and the pump 22a. Said air line 24a is provided with an air valve 25a. If the air valve 25a is opened, air is sucked up out of the storage container 21a in addition to the liquid foodstuff during operation of the pump 22a. The liquid foodstuff from the storage container 21a can therefore be frothed in the pump 22a and dispensed as a frothed beverage additive, for example milk froth. The quantity of air can be metered by a clocked operation of the air valve 25a. In addition, a flushing line 26a leads into the air line 24a. Opening of a flushing valve 27a enables fresh water to be conducted via said flushing line 26a through the milk system in order to clean the latter.

On the delivery side of the pump there is a helical mixer 28a which serves as a counterpressure element for increasing the pressure prevailing in the pump. This assists the frothing of the liquid foodstuff. As an alternative to the helical mixer, any other counterpressure element, for example a fixed orifice or a labyrinth-like resistance passage element, can also be used.

Downstream of the counterpressure element 28a, two closing valves 29, 29' are arranged in a parallel connection. Opening of the valve 29 enables the liquid foodstuff conveyed by the pump 22a to be conducted out of the storage container 21a via a foodstuff line 33a to a heating device 30 in the form of a thermoblock and via the latter onto the beverage outlet 10a at the outlet head 10. The thermoblock 30 heats the liquid foodstuff such that the latter is dispensed as a heated beverage ingredient for preparing a hot beverage. Alternatively, the valve 29 can be closed and the valve 29' opened. By doing this, the thermoblock is circumvented and the conveyed liquid foodstuff dispensed directly, i.e. without heating, at the beverage outlet 10a of the outlet head 10. This option can be selected if a cooled beverage, for example iced coffee or iced chocolate, is desired instead of a hot beverage.

The apparatus additionally has a second hot water boiler 40. The latter can be used to pour hot water for cleaning purposes into a detergent mixing container 41. In addition, detergent can be conveyed from a detergent container 43 into the detergent mixing container 41 via a metering pump 42. A detergent solution is thereby mixed. The intake line coming from the pump 22a can be connected to the detergent mixing container 41 via a repluggable connecting element 44a. Cleaning liquid can therefore be sucked up and conveyed through the milk system. The drainage valve 14a is opened in this case in the direction of the drain line 15 such that the detergent solution cannot be inadvertently dispensed into a drinking vessel. Subsequently, flushing with water is carried out by opening the valve 27a. A corresponding integrated cleaning system is described in EP 3 349 627 A1, which is incorporated by reference here in order to avoid unnecessary repetitions.

The connecting element 44a and the parallel connecting element 44b for the second storage container 21b serve as plug-in connections for the storage containers and optionally for the detergent mixing container 41 which can be connected instead of the storage containers 21a, 21b in order to carry out cleaning.

The thermoblock 30 has two separate fluid paths 31a, 31b. The fluid path 31a is connected to the foodstuff line 23a coming from the first storage container 21a while the fluid path 31b is connected to the foodstuff line 32b coming from the second storage container 21b.

Figure 2:
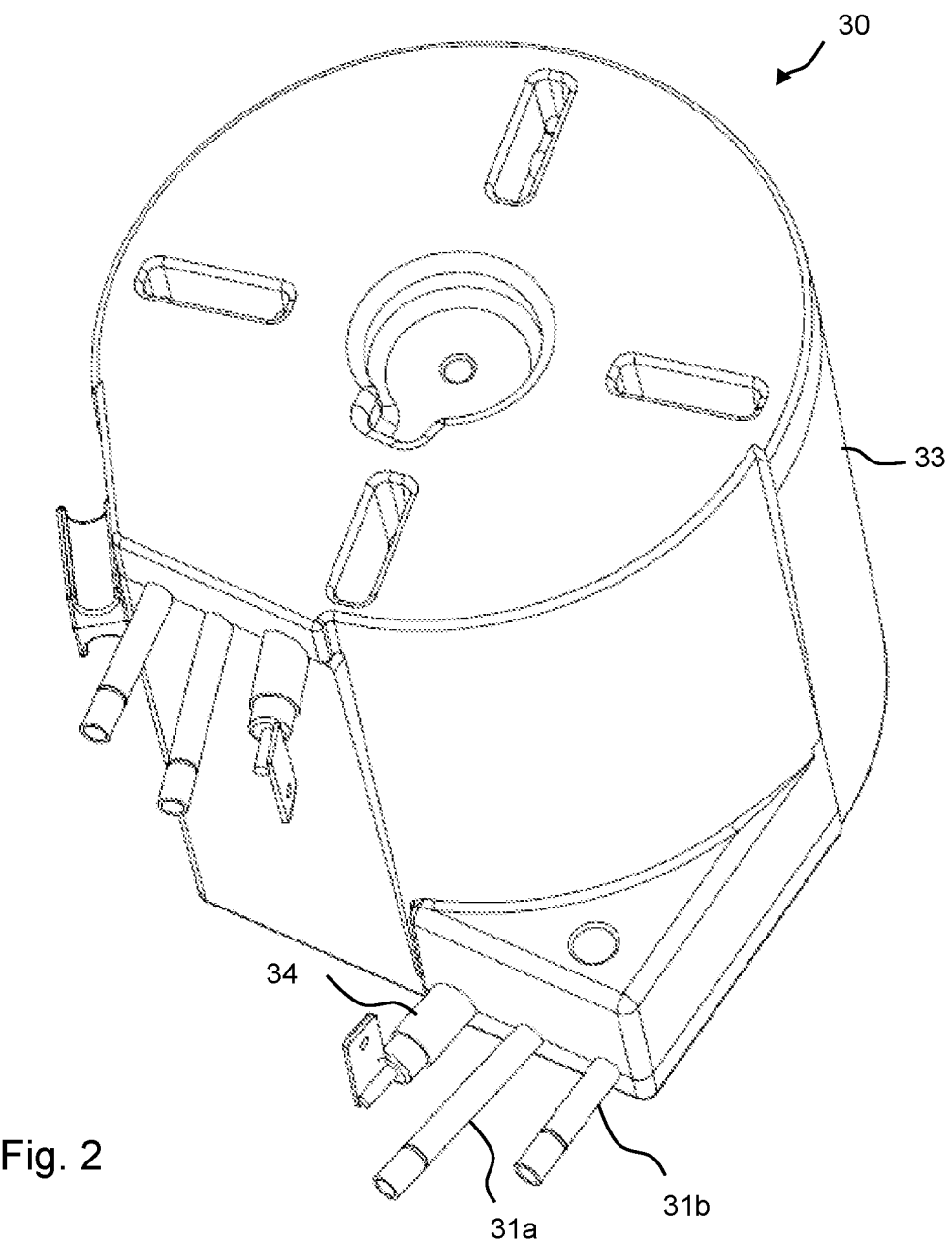
FIG. 2 shows an isometric illustration of the thermoblock used in the hot beverage dispensing apparatus.
Figure 3:
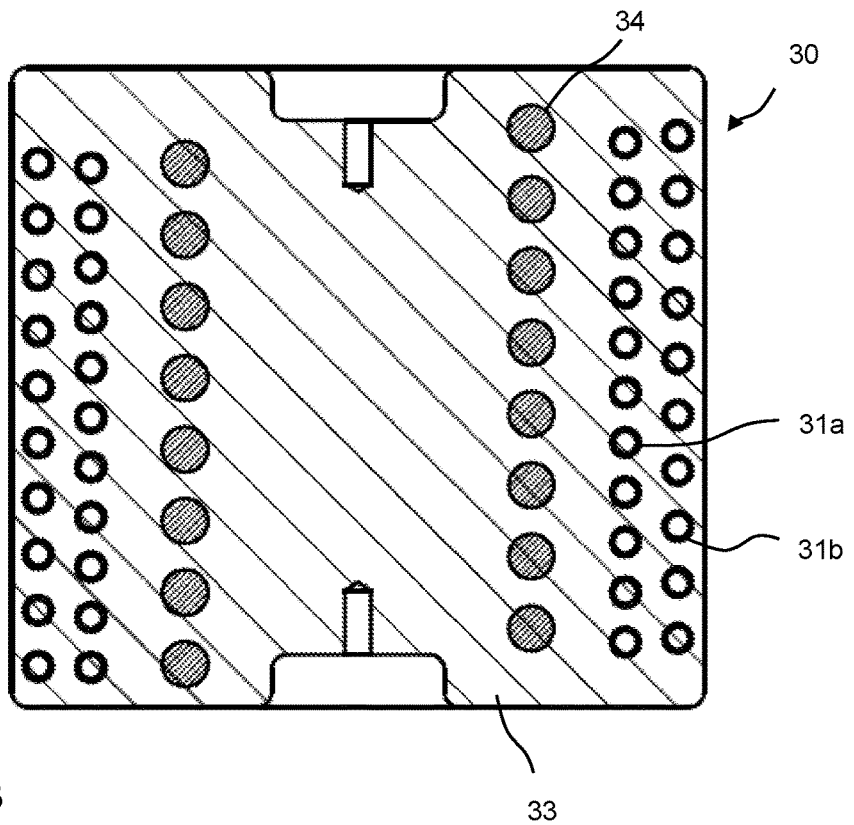
FIG. 3 shows a section through a thermoblock with two separate fluid paths.
Figure 4:
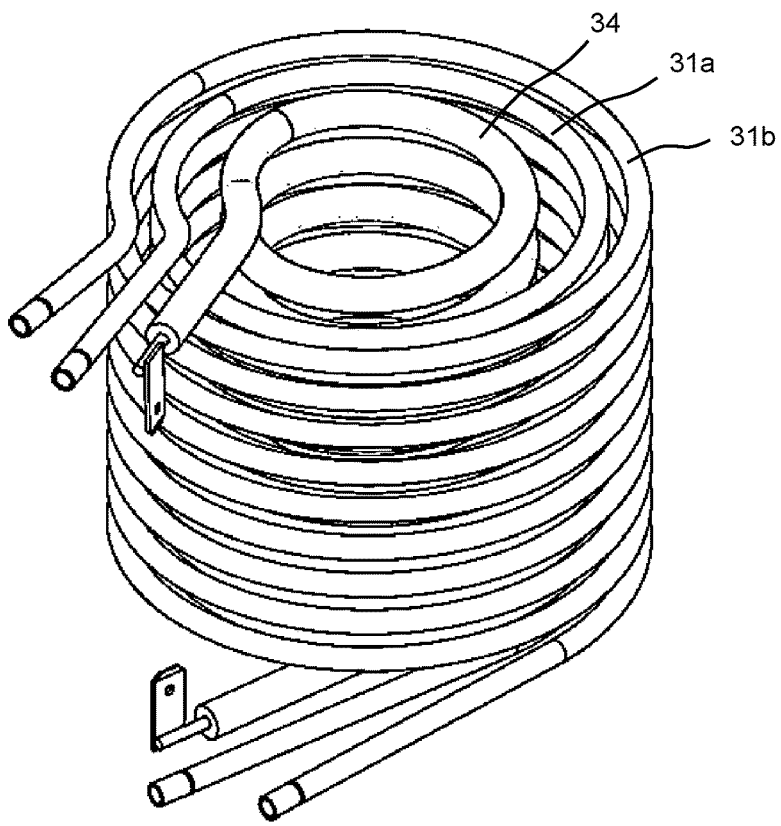
FIG. 4 shows an isometric illustration of the helical fluid lines and of the heat of the thermoblock from FIG. 2.

FIGS. 2 to 4 illustrate the design of the thermoblock 30 in more detail. The basic body 33 of the thermoblock 30 is composed of a cast aluminum body. Embedded in the latter are the lines serving as fluid paths 31a, 31b and an electric heater 34 with electric connection contacts. The lines 31a, 31b are composed of stainless steel and run helically within the thermoblock 30. The electric heater 34 is likewise configured in a helical manner. The helical heater 34 and the helical lines 31a, 31b are arranged here concentrically about the center axis of the thermoblock 30, with the heater 34 forming the innermost coil.

In an alternative embodiment, the thermoblock could also be formed of a basic body made from copper, onto which foodstuff lines are soldered as fluid paths. In this case, the heater could be arranged in the interior of the basic body or on the side thereof opposite the foodstuff lines.

The thermoblock 30 is brought by the heater 34 to a constant operating temperature between 60° C. and 70° C. A fluid which flows through the helical lines 31a, 31b is heated on its path through the thermoblock 30. Due to the large thermal mass of the cast aluminum body 33, a constant operating temperature can be kept via the heater 34 when liquid foodstuffs are conducted through the fluid paths 31a and/or 31b. The temperature of the thermoblock 30 is continuously measured by a temperature sensor 35 on said thermoblock 30 and can be readjusted via the heater 34.

The two boilers 12, 40 are connected to a water inlet 45. A water pump with which fresh water is conveyed is located in the inlet line. In addition, there are flow meters 47, 48 in the two supply lines leading from the water pump 46 to the boilers, the flow meters being used to measure the quantity of water. By this, the quantity of beverage can be metered with respect to the heating water boiler 12 and the concentration of the detergent solution in the detergent mixing container 41 with respect to the heating water boiler 40. In addition, a line branches off from the water supply line and leads via the flushing valves 27a, 27b to the air intake lines of the two fluid branches. As already described, the respective fluid branch of the milk system can be flushed via said valves.

In the exemplary embodiment, a thermoblock having two separate fluid paths has been shown. In principle, it would also be possible to provide separate thermoblocks for the two types of foodstuff. Similarly, also more than two fluid paths can be provided in a corresponding manner if more than two different liquid foodstuffs are intended to be stored and selectively dispensed. It would also be possible to provide separate thermoblocks if there are more than two liquid foodstuff types.

In order to clean the thermoblock 30, thermal regeneration is carried out; for this purpose, the thermoblock 30 is filled with cold water by opening of the valves 27a and 27b. The valves 23a, 23b are closed in this case, and therefore the pumps 22a, 22b suck up water from the water inlet 47 via the air lines 24a, 24b. In addition, the drainage valves 14a, 14b are switched over to the drainage line 15 such that heated water from the thermoblock 30, instead of passing to the outlet head 10, passes directly into the drain. The thermoblock 30 is subsequently heated up to a temperature of approximately 125° C. The water in the fluid paths 31a, 31b begins to boil. The valves 27a and 27b are now briefly opened again several times in order to flush the heated thermoblock several times with water. Local evaporation and re-condensation occurs in the process. The associated cavitation leads to severe wall shear stresses and pressure fluctuations. Even the repeated flushing of the thermoblock 30, which is heated to a high temperature, with cold water without detergent thereby has a very great cleaning action for the milk residues adhering in the thermoblock. In addition, the structure of the milk deposit is broken up by evaporation of the moisture contained therein and can thereby be detached more easily.

The thermal regeneration of the thermoblock 30 can either be carried out after a "normal" cleaning or integrated in the "normal" cleaning.

For the "normal" cleaning, the heater is switched off and a cleaning operation is carried out by a hot detergent solution mixed previously in the detergent mixing container 41 being conveyed through the thermoblock by means of the pumps 22a, 22b. For this purpose, the pumps 22a, 22b, instead of being connected to the two storage containers 21a, 21b, are connected to the intake line leading to the detergent mixing container 41 by the two connecting elements 44a, 44b being re-plugged manually into the cleaning position. The position of the connecting elements 44a, 44b can be monitored here by means of reed contacts, and therefore a cleaning operation is enabled by the controller only when the connecting elements 44a, 44b are brought into the cleaning position. The valves 23a, 23b are opened such that the pumps 22a, 22b suck up the detergent solution. After the detergent solution has been conducted through the milk system, flushing is carried out again with hot water.

After the end of the described "normal" cleaning operation and the manual steps required for this purpose, the thermoblock 30 can be thermally regenerated autonomously.

Alternatively, after the detergent solution has been conducted through, the thermal regeneration including subsequent cooling of the thermoblock 30 can be undertaken. This is followed by the second part of the "normal" cleaning by flushing being carried out with hot water.

The hot beverage dispensing apparatus is activated via a programmable control device 50. The latter is connected to a user interface 51, for example in the form of a touch-sensitive display or another type of display and input unit. The control device 50 is used to activate all of the functions of the hot beverage dispensing apparatus, including the water pumps 22a, 22b, all of the directional control valves 14a, 14b, 23a, 23b, 27a, 27b, the activation of the thermoblock 30 and of the cleaning system 41, 42, 43 and of the metering pump 42 thereof. The temperature can also be controlled by the control device. For this purpose, the controller reads the temperature sensor 35 which is connected to the thermoblock 30. The control device 50 can thus be used to control the preparation of coffee beverages or other hot beverages in the normal operation and also to carry out cleaning of the milk system and of the thermoblock 30.

Of course, it also lies within the scope of the invention that the valves, the pumps and/or the heater of the thermoblock 30 are activated via separate control components which in turn communicate with one another.

The invention claimed is:

1. An apparatus for dispensing a liquid foodstuff, the apparatus comprising:
    a heat store made from a metal of at least one of high thermal mass or conductivity; and
    a heating device for heating the liquid foodstuff, the heating device including a fluid path for the liquid foodstuff and an electric heater, wherein fluid path and the electric heater are both in direct thermal heat-transferring contact with the heat store;

wherein the heat store is configured to be brought by the heater to an operating temperature which lies below 80° C.;

at least one directional control valve by which the fluid path is connectable to a flushing line via which at least one of water or detergent solution is conductible through the fluid path for cleaning purposes; and a controller configured to control the heating device to heat to a high temperature of above 100° C. in order to carry out thermal regeneration, and to open the directional control valve one or more times for conducting at least one of the water or detergent solution through the fluid path of the heating device that is heated to the high temperature.

2. The apparatus as claimed in claim 1, wherein the controller is configured to fill the fluid path with at least one of the water or the detergent solution via the directional control valve prior to heating of the heating device to the high temperature of above 100° C.

3. The apparatus as claimed in claim 1, in which the controller is configured to briefly open the directional control valve several times for intermittently conducting water through the fluid path of the heating device heated to a high temperature.

4. The apparatus as claimed in claim 1, further comprising a pump for conveying the liquid foodstuff out of a storage container via a foodstuff supply line, and the heating device is arranged on a delivery side of the pump for heating the liquid foodstuff conveyed by the pump.

5. The apparatus as claimed in claim 1, further comprising a pump for conveying the liquid foodstuff out of a storage container via a foodstuff supply line, and the flushing line opens into the foodstuff supply line on a suction side of the pump.

6. The apparatus as claimed claim 5, further comprising an air inlet opening into the foodstuff supply line on the suction side of the pump, and the flushing line opens into an air intake line leading from the air inlet to the foodstuff supply line.

7. The apparatus as claimed in claim 1, wherein the controller is further configured in order, within the scope of the thermal regeneration when the heating device is heated to the high temperature of above 100° C., to conduct cold fresh water through the fluid path and previously or subsequently when the heating device is switched off or heated to the operating temperature, to conduct flushing liquid through the fluid path of the heating device.

8. The apparatus of claim 1, wherein the liquid foodstuff is milk.

9. A method for operating a heating device for heating a liquid foodstuff as the liquid foodstuff is being dispensed, the heating device including a fluid path for the liquid foodstuff and an electric heater, and the fluid path and the electric heater are both in direct thermal heat-transferring contact with a heat store made from a metal of at least one of high thermal mass or conductivity, the method comprising:

bringing the heat store to an operating temperature of below 80° C. by the heater for a dispensing operation, and for cleaning:

connecting the fluid path via at least one directional control valve to a flushing line via which at least one of water or detergent solution is conducted through the fluid path, heating the heating device to a high temperature of above 100° C. in order to carry out thermal regeneration, and opening the directional control valve one or more times in order to conduct the at least one of the water or the detergent solution through the fluid path of the heating device which is heated to a high temperature of above 100° C.

10. The method of claim 9, wherein the liquid foodstuff is milk.

* * * * *